United States Patent

[11] 3,596,179

[72] Inventor Colin Edward Hunter
Luton, England
[21] Appl. No. 771,753
[22] Filed Oct. 30, 1968
[45] Patented July 27, 1971
[73] Assignee George Kent Limited
Luton, England
[32] Priority Nov. 6, 1967
[33] Great Britain
[31] 50420/67

[54] DETECTION OF PEAK AND/OR TROUGH POINTS OF A VARIABLE ELECTRIC CURRENT
8 Claims, 3 Drawing Figs.

[52] U.S. Cl. .......... 324/103 P, 324/111
[51] Int. Cl. .......... G01r 19/16, G01r 1/00
[50] Field of Search .......... 324/103, 103 P, 111, 102; 328/28, 151, 132

[56] References Cited
UNITED STATES PATENTS

| | | | |
|---|---|---|---|
| 2,562,694 | 7/1951 | Brown | 328/28 |
| 3,273,035 | 9/1966 | Inderhees | 328/151 X |
| 2,591,738 | 4/1952 | Spencer | 324/102 |

*Primary Examiner*—Rudolph V. Rolinec
*Assistant Examiner*—Ernest F. Karlsen
*Attorney*—Young and Thompson

ABSTRACT: A method and apparatus are disclosed for detecting peak and/or trough points of a variable voltage signal in which the signal is applied through a capacitor to an amplifier and the amplifier output is divided into separated pulses by a switch recurrently operable to provide 100 percent feedback across the amplifier. A trigger circuit responsive to the pulses gives an output with a polarity indicating the direction of change of the variable voltage signal. A second switch can be operated recurrently by the means controlling the first switch to select only the final portion of each pulse for application to the trigger circuit.

INVENTOR
COLIN EDWARD HUNTER
BY Young & Thompson
ATTYS.

DETECTION OF PEAK AND/OR TROUGH POINTS OF A VARIABLE ELECTRIC CURRENT

The invention relates to the detection of peak and/or trough points of a variable electric signal.

The need to detect peak and/or trough points in a variable electric signal arises in several applications, for example, in gas chromatography where an output is obtained including successive peaks with intermediate troughs. Detection of the points of zero slope at the bottoms of the troughs, which can occur over a wide range of values, is required for control and/or record purposes, for example, so that the integral of the peak can be determined and printed out, and the equipment reset to deal with the next peak. The invention is particularly but not exclusively suited to this application.

The invention accordingly provides a method of detecting peak and/or trough points of a variable voltage signal, the method comprising the steps of applying the signal through a capacitor to an amplifier, dividing the amplifier output into separated pulses, and applying such pulses to develop an output having a polarity indicative of the direction of change of the variable voltage signal.

The invention also provides apparatus for detecting peak and/or trough points of a variable voltage signal, the apparatus comprising an amplifier in series with a first capacitor across terminals to which the variable voltage signal can be applied, means including a switch recurrently operable to divide the amplifier output into pulses and means responsive to the pulses to develop an output having a polarity indicative of the direction of change of the variable voltage signal. The amplifier operating means can comprise a 100 percent feedback path across the amplifier terminals and means recurrently rendering the path operative. The means responsive to the amplifier output pulses can be constituted by a trigger circuit. Instead of applying the entire amplifier output pulse to this means, only a portion of each pulse, conveniently a portion just before the end of the pulse, can be used. This portion can be selected by means of a second recurrently operable switch arranged to allow transmission of the amplifier output during a selected portion only of the period during which the first switch is open.

The invention may be better understood from the following description and from the accompanying drawings, which relate to preferred embodiments of the invention and are given by way of example only. In the drawings.

Figure 1:
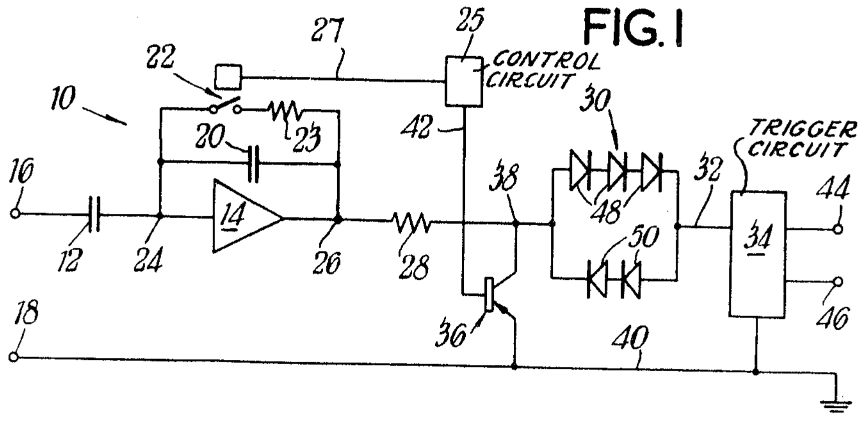
FIG. 1 is a circuit drawing of apparatus for detecting peak and/or trough points of a variable voltage signal in accordance with the invention.

The apparatus shown in FIG. 1 has a circuit 10 comprising a capacitor 12 arranged in series with an amplifier 14 across terminals 16, 18 to which the variable voltage signal is applied. A second capacitor 20 in parallel with a switch 22 is connected across the amplifier input and output terminals 24 and 26. The switch 22 could be a transistor switch or, as shown, a solenoid operated switch arranged to be recurrently opened and closed at suitable intervals, normally regular intervals. A resistor 23 is included in series with the switch 22 to protect the switch contacts against current surges. The apparatus of FIG. 1 is particularly but not exclusively suited for use in gas chromatography and in such an application the switch 22 could conveniently be opened and closed at intervals of one second by a signal carried on a line 27 from a control circuit 25, or by any other convenient means.

The output of the amplifier 14 is taken from the terminal 26 to a detector circuit comprising a resistor 28 in series with means 30 providing an impedance. The means 30 can comprise a second resistor or preferably, as shown, an arrangement of diodes providing appropriate impedence. The output from the diodes is applied on a line 32 to a bistable trigger circuit 34. A switch 36 enables connection to be made between a point 38, between the resistor 28 and the impedance means 30, to a line 40 connected to the terminal 18 and to earth.

The switch 36 is conveniently but not necessarily a transistor switch as shown; it is arranged to be recurrently operated at the same frequency as the switch 22 by signals carried on a line 42 from the control circuit 25. The switch 36 is however arranged to open for only a short period, preferably at the end of the periods during which the switch 22 is open.

The trigger circuit 34 operates to provide in one state positive and negative outputs at first and second output terminals 44 and 46 respectively; in the other state negative and positive outputs appear respectively at the output terminals 44 and 46. The circuit 38 is arranged to be switched from the one state to the other on receiving an input pulse on the line 32 at a sufficiently lower voltage than the preceding input to overcome its backlash or hysteresis; return to the one state follows when a pulse of sufficiently higher voltage is received.

The impedance provided by the means 30 must be above a certain value or each closure of the switch 36 may short out the trigger circuit feedback, so bringing the trigger circuit into a particular one of its stable states. Too high an impedance of the means 30 on the other hand would require an inconveniently large voltage pulse for driving the trigger circuit. The diode arrangement shown has a first limb containing three diodes 48 arranged in series for transmitting a positive signal to the trigger circuit a second limb in parallel with the first an containing a pair of diodes 50 in series for conduction in the opposite direction. The additional diode in the first limb serves to remove the trigger offset voltage and can provide a convenient trigger circuit backlash of the order of 1 volt.

The operation of the apparatus of FIG. 1 is described below.

When the switch 22 is closed there is 100 percent feedback across the amplifier 14 through this switch. The amplifier output is therefore zero, whatever the nature of the input signal at the terminal 16. When the switch 22 is open and the input signal is changing, the amplifier 14 will afford an output the slope of which is proportional to the rate of change of the input and of which the height is proportional to the input change since the switch 22 last opened. Because of the capacitor 12, a constant input at the terminal 16 will afford no output from the amplifier 14.

Whilst the transistor switch 36 is closed, any amplifier output is lead to earth through this switch. When an amplifier output is being produced and the switch 36 is open, the output will be applied to the trigger circuit 34 in the form of a short pulse.

Supposing the input signal at the terminal 16 to be rising, a pulse, which will be negative because of inversion by the amplifier 14, will be applied through the impedance provided by the resistor 28 and the diodes 50 to the trigger circuit 34. T is pulse causes the circuit 34 to give a positive output on the line 44 at the terminal 44 and a negative output at the terminal 46. Further pulses due to a further input rise will not affect the state of the trigger circuit and a subsequent steady value of the input will likewise have no effect because the amplifier 14 then provides no output. If however the input voltage now falls, a lower voltage pulse will be provided by the amplifier 14 which, if lower by a sufficient amount, will switch the trigger circuit to give a negative output at the terminal 44 and a positive output at the terminal 46. A further fall in the input voltage or a steady value thereof will not change this state of affairs, the trigger circuit 34 being switched to provide a positive output only when a sufficient rise in the input voltage has occurred.

In the alternative arrangement the diodes 48 and 50 and the switch 36 are omitted. The trigger circuit 34 still receives pulses from the amplifier output terminal 26 as before and the length of these pulses can be selected by adjustment of the periods during which the switch 22 is open. The arrangement illustrated in FIG. 1 is preferred to this modification because the former enables the time of occurrence of the pulse to be exactly controlled.

Figure 2:
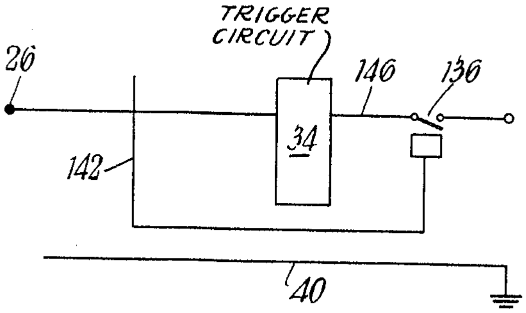
FIG. 2 is a circuit drawing showing a part of the apparatus of FIG. 1 as altered to incorporate a first modification.
Figure 3:
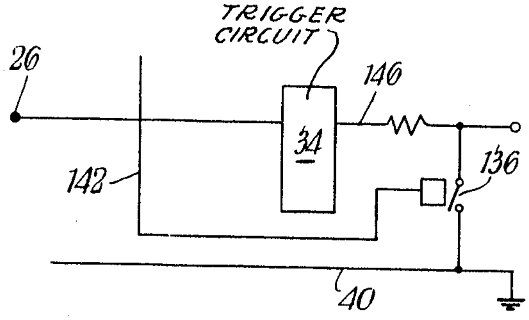
FIG. 3 is a circuit drawing again showing the part of the apparatus of FIG. 1 but as altered to incorporate a second modification.

FIG. 2 shows a modified form for the part of the circuit of FIG. 1 lying to the right of the terminal 26. Although not shown, the circuit of FIG. 2 includes the control circuit 25 but the switch 36, the resistor 28 and the impedance means 30 are again omitted. The pulses provided at the terminal 26 are applied directly to the trigger circuit 34 which has an output line 146 extending through the contacts of a switch 136 operated by signals from the control circuit 25 on a line 142. The condition of the trigger circuit 34 is controlled by the nature of the pulses at the terminal 26 in the same way as in the apparatus of FIG. 1. The function of the switch 36 in the apparatus of FIG. 1 is performed by the switch 136 by rendering the output on the line 146 effective only during the recurring periods in which the switch is closed. The switch 136 can instead be arranged in shunt as shown in the circuit of FIG. 3 which in other respects resembles that of FIG. 2. The switch 136 is opened only during a part of the time for which the switch 22 is open, preferably a part at or toward the end of this time.

It will be noted that considerable gain is possible; for example, by making the capacitors 12 and 20 in the circuit illustrated in FIG. 1 equal to 10$\mu$F and 1$n$F respectively, a gain of the order of 10,000 is obtained. The amplifier voltage offset appears unamplified at the output and drift is corrected at each operation of the switch 22.

The invention thus provides, within its scope as defined by the following claims, a variety of methods and apparatus, all affording useful and advantageous detection of peak and/or trough points of a variable electric signal.

I claim:

1 An apparatus for detecting peaks and/or troughs of a variable voltage signal comprising an input circuit for receiving a variable voltage signal having peaks and troughs, said input circuit including capacitor means to block a constant voltage signal and to pass a variable voltage signal, amplifier means having an input connected to receive a variable voltage signal from said capacitor means and an output control means for operating said amplifier means during a plurality of successive operational periods between successive peaks of said variable voltage signal to provide first operational periods during which no output signal is provided at the output of said amplifier means in response to a variable voltage signal on the input thereto and a second operational period occurring after each first operational period during which said amplifier means is caused to provide an output pulse at the output thereof which is dependent in polarity on the sense of the variation of the variable voltage signal occurring on said input since the next preceding second operational period, output circuit means for providing an output signal dependent in polarity on the polarity of an input signal thereto with respect to the next preceding input signal thereto, said output circuit means operating at a triggering level to change polarity between one of two opposed polarity states upon the occurrence of a peak or trough in said variable input voltage signal, and detector circuit means connected between the output of said amplifier means and said output circuit means for converting output pulses from the output of said amplifier means to input signals to control the operational triggering level of said output circuit means.

2. Apparatus as claimed in claim 1 which includes switch means connected between said amplifier means and said detector circuit means, said switch means operating to effect a supply of each said output pulse to the output circuit means during only a portion of the duration thereof.

3. Apparatus as claimed in claim 2, in which said output control means includes trigger means to coordinate the operation of said amplifier means and switch means.

4. Apparatus as claimed in claim 3 in which said trigger means causes said switch means to effect the supply of only an end portion of each output pulse.

5. Apparatus as claimed in claim 1 in which said amplifier means includes an amplifier and a 100 percent feedback path across the amplifier, said control means including means for recurrently rending said feedback path operative.

6. Apparatus as claimed in claim 5 in which a feedback capacitor in included in said feedback path, the ratio of the capacitances of said capacitor means and said feedback capacitor being such that the apparatus operates with substantial gain.

7. Apparatus as claimed in claim 5 which includes first switch means connected between said amplifier means and said detector circuit means to effect a supply of each said output pulse to the output circuit means during only a portion of the duration thereof and second switch means in said feedback path across the amplifier for recurrently rendering said feedback path operative, said control means including trigger means to coordinate the operation of said first and second switch means.

8. Apparatus as claimed in claim 1 which includes switch means connected between said output means and an output terminal for said apparatus, said switch means operating to effect a supply of a signal from said output means to said output terminal during a part only of the duration of each output pulse from said amplifier means.